US012437364B2

(12) United States Patent
Wong et al.

(10) Patent No.: US 12,437,364 B2
(45) Date of Patent: Oct. 7, 2025

(54) REGION-OF-INTEREST (ROI) GUIDED SAMPLING FOR AI SUPER RESOLUTION TRANSFER LEARNING FEATURE ADAPTATION

(71) Applicant: MediaTek Singapore Pte. Ltd., Singapore (SG)

(72) Inventors: Wai Mun Wong, Singapore (SG); Chia-Da Lee, Hsinchu (TW); Cheng Lung Jen, Hsinchu (TW); Chun Chen Lin, Hsinchu (TW); Shih-Che Chen, Hsinchu (TW); Pei-Kuei Tsung, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 615 days.

(21) Appl. No.: 17/870,261

(22) Filed: Jul. 21, 2022

(65) Prior Publication Data

US 2023/0053776 A1 Feb. 23, 2023

Related U.S. Application Data

(60) Provisional application No. 63/234,728, filed on Aug. 19, 2021.

(51) Int. Cl.
*G06T 3/4053* (2024.01)
*G06T 3/4046* (2024.01)

(52) U.S. Cl.
CPC .......... *G06T 3/4053* (2013.01); *G06T 3/4046* (2013.01); *G06T 2200/24* (2013.01)

(58) Field of Classification Search
CPC ....... G06T 3/40; G06T 3/4046; G06T 3/4053; G06T 2200/24
See application file for complete search history.

(56) References Cited

U.S. PATENT DOCUMENTS

| 10,558,908 B2* | 2/2020 | Wang ........................ G06N 3/08 |
| 10,783,611 B2* | 9/2020 | Vemulapalli .......... G06T 3/4046 |
| 2017/0161545 A1* | 6/2017 | Champlin ............ G06V 20/695 |
| 2020/0311926 A1* | 10/2020 | Tian ........................ G06T 3/4053 |
| 2023/0052483 A1* | 2/2023 | Cai .......................... G06N 3/048 |

OTHER PUBLICATIONS

Dong, et al. (Image Super-Resolution Using Deep Convolutional Networks), pp. 295-307. (Year: 2016).*
Shi, et al. (Real-Time Single Image and Video Super-Resolution Using an Efficient Sub-Pixel Convolutional Neural Network), pp. 1874-1883. (Year: 2016).*

* cited by examiner

*Primary Examiner* — Daniel G Mariam
(74) *Attorney, Agent, or Firm* — Tong J. Lee (57) ABSTRACT

A system collects a training dataset for training an artificial intelligence (AI) model. The system receives high-resolution (HR) images and information of one or more regions-of-interest (ROIs) in the HR images. The system maps a stride distribution to the ROIs, and samples the HR images with non-uniform strides according to the ROIs and the stride distribution to generate corresponding low-resolution (LR) images. The system then trains the AI model to perform super-resolution (SR) operations using training pairs formed by the HR images and respective corresponding LR images.

18 Claims, 8 Drawing Sheets

REGION-OF-INTEREST (ROI) GUIDED SAMPLING FOR AI SUPER RESOLUTION TRANSFER LEARNING FEATURE ADAPTATION

CROSS-REFERENCE TO RELATED APPLICATIONS

This application claims the benefit of U.S. Provisional Application No. 63/234,728 filed on Aug. 19, 2021, the entirety of which is incorporated by reference herein.

TECHNICAL FIELD

Embodiments of the invention relate to customized training data collection for AI super-resolution operations.

BACKGROUND

Super-resolution refers to the task of upscaling a low resolution (LR) image to a higher resolution image, referred to as a super-resolution (SR) image; e.g., from an input image of (720×480) pixels to an output image of (3840×2160) pixels. However, upscaling an image can cause image degradation such as blurring, noise, distortion, color condition, sharpness, contrast, etc. Thus, many modern image display devices perform super-resolution with image enhancement to improve the output image quality.

Some image enhancement techniques utilize artificial intelligence (AI) to aid SR operations. An AI agent (e.g., AI processor) can use one or more trained neural networks to upscale an LR image. Training neural networks typically requires a large amount of training data and the training process is time-consuming. Furthermore, a neural network trained for one type of images or features generally does not perform well for another type of images or features. Training neural networks for multiple types of images and features demands an even greater amount of training data and training time.

Thus, there is a need for improving the training process of AI-aided SR operations.

SUMMARY

In one embodiment, a method is provided for collecting a training dataset for training an artificial intelligence (AI) model. The method comprises the steps of receiving high-resolution (HR) images and information of one or more regions-of-interest (ROIs) in the HR images; mapping a stride distribution to the ROIs; and sampling the HR images with non-uniform strides according to the ROIs and the stride distribution to generate corresponding low-resolution (LR) images. The method further comprises the step of training the AI model to perform super-resolution (SR) operations using training pairs formed by the HR images and respective corresponding LR images.

In another embodiment, a system is operative to collect a training dataset for training an AI model. The system comprises a memory to store the AI model; and processing hardware coupled to the memory. The processing hardware is operative to receive HR images and information of one or more ROIs in the HR images; map a stride distribution to the ROIs; and sample the HR images with non-uniform strides according to the ROIs and the stride distribution to generate corresponding LR images. The processing hardware is further operative to train the AI model to perform SR operations using training pairs formed by the HR images and respective corresponding LR images.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a user with a method and system to collect training pairs for training an AI model to perform SR operations. The AI model is adapted to features (e.g., objects, elements, etc.) in images such as computer-generated (CG) images in a video game. The feature adaptation is aided by regions-of-interest (ROIs) specified by a user during a training data collection process. A user may select regions in an image that contain game objects or elements as ROIs, and specify stride values and/or distribution functions for the ROIs. To focus on the game features in the ROIs, the user may direct a computer to sample pixels outside the ROIs with a higher stride value than pixels inside the ROIs. Thus, the image is down-sampled with non-uniform strides according to the user-specified stride values and/or distribution functions. The image and its down-sampled counterpart form a training pair. Training pairs collected in this ROI-guided process are used to train an AI model (e.g., a neural network) to perform super-resolution (SR) operations.

The ROI-guided process can significantly reduce the amount of training data needed for a neural network to adapt to different settings, such as from a first game to a second game. An AI model may be trained to perform SR for the first game, and may produce degraded outputs when performing SR for the second game. A use may decide that the degradation to game features such as icons and maps cannot be tolerated and mark areas in the second game images as ROIs. The AI model is then trained using training pairs that are collected from these ROIs only. Thus, the AI model can transfer its learning from the first game to the second game with minimal amount of training data for the second game. The learning transferability enables an AI model to perform enhanced SR operations on diverse game images and features with minimal overhead on training time and no extra cost on hardware. As the stride values can be assigned to different areas of an image with flexibility, a user may base the assignment on the desired image quality, styles and/or textures of different ROIs and selectively enhance specific target areas.

As used herein, the terms "low resolution (LR)" and "high resolution (HR)" are relative to each other; that is, an LR image has fewer pixels than an HR image for the same display size (e.g., N square inch). For example, An LR image may have (720×480) pixels and an HR image may have (3840×2160) pixels for the same display size. It is understood that an LR image and an HR image may have any number of pixels as long as the LR image has fewer pixels than the HR image for the same display size. The resolution of an SR image is higher than the resolution of an LR image, and maybe the same as, or lower than that of an HR image. In the following description, the terms "image" and "frame" are used interchangeably. The term "game" refers to a video game, which can be played on a wide range of electronic devices including a gaming device, a computer, a mobile device, etc.

Figure 1A:
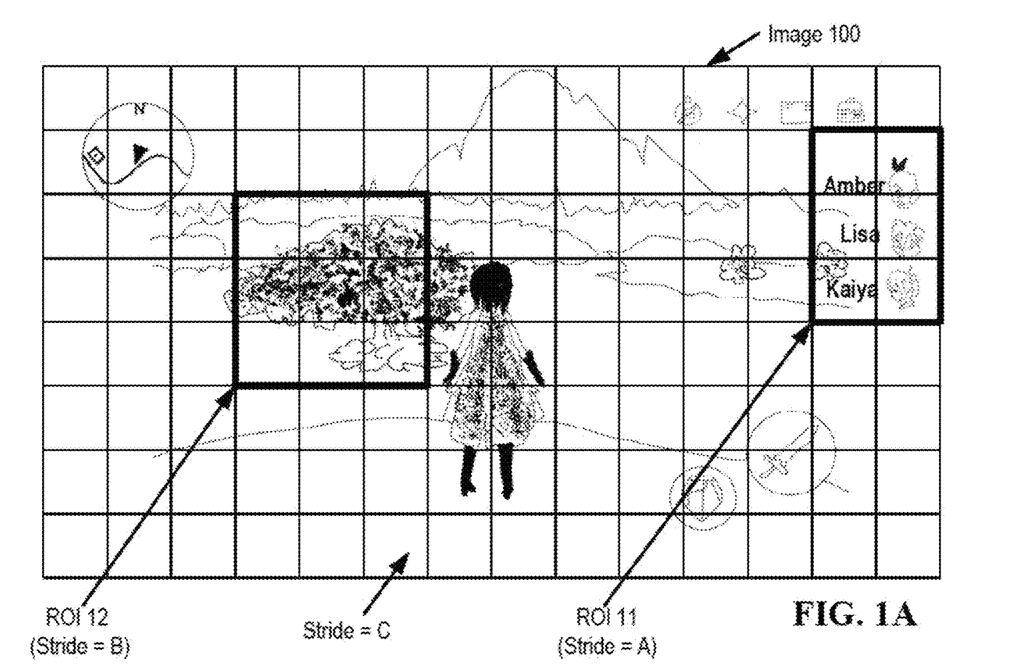
FIG. 1A is a diagram illustrating an example of an image provided to a user according to one embodiment.

FIG. 1A is a diagram illustrating an example of an image 100 provided to a user according to one embodiment. Image 100 is a computer-generated (CG) image rendered in a video game. Through a user interface, the user can define one or more ROIs in image 100 and indicate desired sampling rate in each ROI. In one embodiment, the sampling rate is defined in terms of a stride value. For example, stride=1 means that the every pixel in the image is sampled, and stride=2 means that every other pixel in the image is sampled. On a 2-dimensional (2D) x-y plane aligned with the image, the same stride value may apply to both x-axis and y-axis directions. Alternatively, different stride values may apply to the x-axis direction and the y-axis direction.

In this example, image 100 is partitioned into a 2-dimensional (2D) grid according to one embodiment. Each square in the 2D grid is called an image patch or a patch. Each ROI contains one or more patches. Each patch contains a predetermined (or configurable) number of pixels. A user may define the boundaries of an ROI 11 and an ROI 12. In this example, the user further defines a stride value=A for ROI 11, a stride value=B for ROI 12, and a stride value=C for the rest of image 100. The values A, B, and C can be any positive integers with C>A and C>B. Image 100 is an HR image and the customized sampling generates a corresponding LR image. The HR and LR image pair is then used as a training pair to train an AI model (e.g., a neural network) to perform SR operations. An electronic device on which the video game is played uses the AI model to perform SR operations. In the following description, a neural network is used as an example of an AI model. It is understood that a different form of an AI model may also be used.

Unlike conventional sampling where the sampling rate is uniform across an entire image, the ROI-guided sampling disclosed herein enables different sampling rates for different parts of an image. An image region that contains important features may be defined as an ROI and assigned a low stride value. A lower stride value corresponds to a higher resolution; thus more details are preserved in the ROI. For example, a game developer may want certain game features, such as a game menu, clickable buttons, navigation maps, etc. to have a higher resolution than other game contents, and may define ROIs to encompass these game features. By allowing non-uniform sampling over an image, an AI model can produce an SR image with an improved image quality for the ROIs.

Figure 1B:
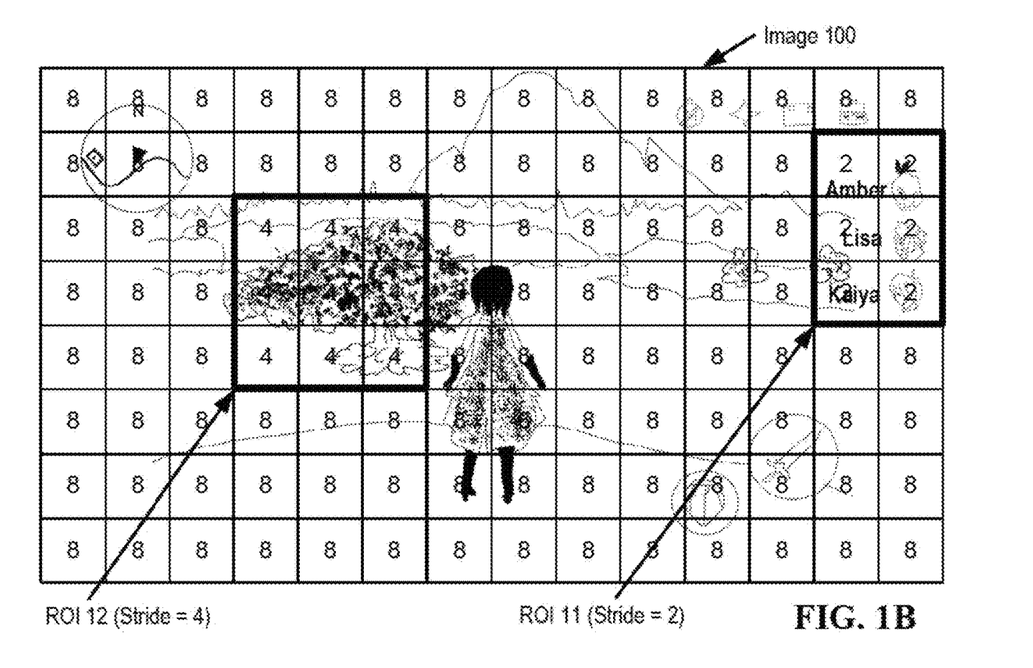
FIG. 1B is a diagram illustrating an example of an image with assigned stride values according to one embodiment.

FIG. 1B is a diagram illustrating an example of image 100 with assigned stride values according to one embodiment. A user may assign a stride distribution (e.g., a stride value) to each ROI; e.g., stride=2 for ROI 11 and stride=4 for ROI 12. In an alternative embodiment, a user may assign a stride value to each patch in image 100. Different patches, whether inside or outside an ROI, may be assigned different stride values. In yet another embodiment, a user may choose one or more multivariate distribution functions to define the stride distribution for one or more ROIs and provide parameters for the chosen distribution functions. For example, the user may choose a 2D Gaussian distribution function as the stride distribution for one or more ROIs in an image, and provide the mean and standard deviation for the Gaussian distribution. The user may also choose a multi-kernel distribution function for one or more ROIs in an image and provide weights for the kernels. The user may choose different distribution functions for different ROIs in the same image or different images, or the same distribution function with different parameters for different ROIs in the same image or different images. In some embodiments, a user may specify stride values for some of the ROIs and distribution functions for some other ROIs.

Figure 2A:
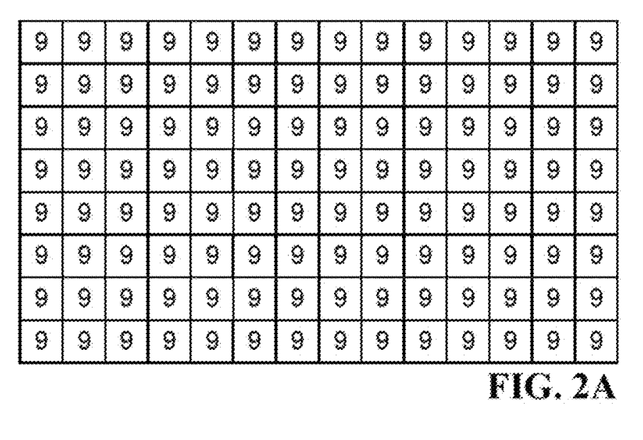
FIGS. 2A, 2B, 2C, and 2D are diagrams illustrating a number of stride value assignments according to some embodiments.
Figure 2B:
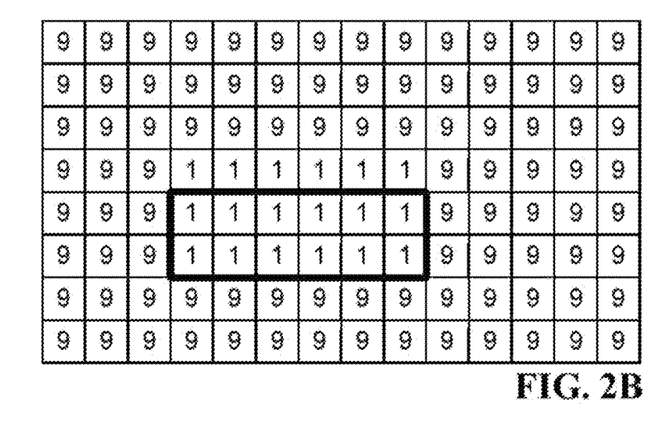
Figure 2C:
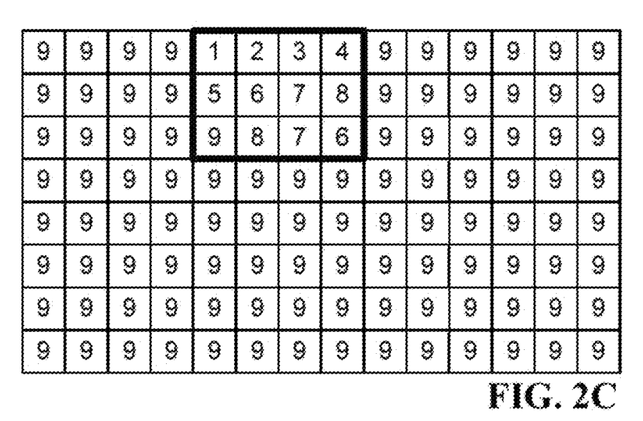
Figure 2D:
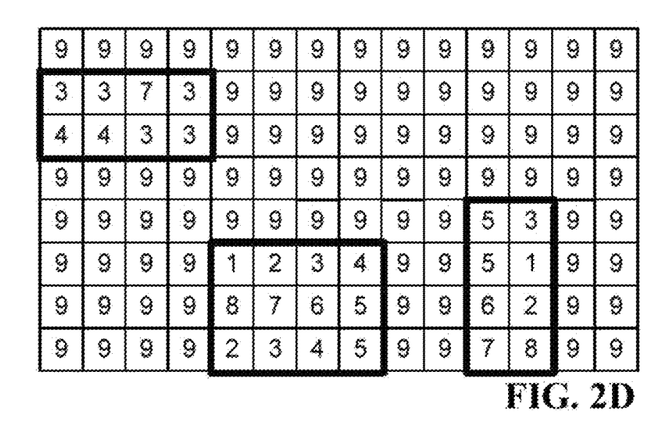

FIGS. 2A, 2B, 2C, and 2D are diagrams illustrating a number of stride value assignments according to some embodiments. Each diagram shows a 2D grid that can be mapped to an image, such as image 100 in FIGS. 1A and 1B. Each patch in a corresponding 2D grid is assigned a stride value. The number may be individually assigned by a user or generated from a distribution function. FIG. 2A illustrates uniform sampling without any ROI. All of the patches have the same stride value. FIG. 2B illustrates ROI-guided sampling with one ROI, where a uniform stride value is assigned to patches inside the ROI and a different uniform stride value is assigned to patches outside the ROI. FIG. 2C illustrates another ROI-guided sampling with one ROI, where customized stride values are assigned to patches inside the ROI. FIG. 2D illustrates another ROI-guided sampling with multiple ROIs, where customized stride values are assigned to patches inside each ROI.

Figure 3A:
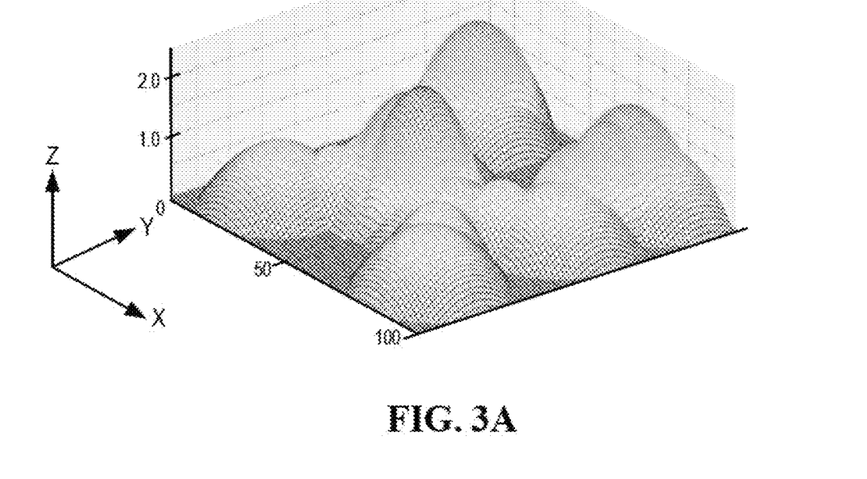
FIG. 3A illustrates an example of a multivariate multi-kernel distribution function according to one embodiment.
Figure 3B:
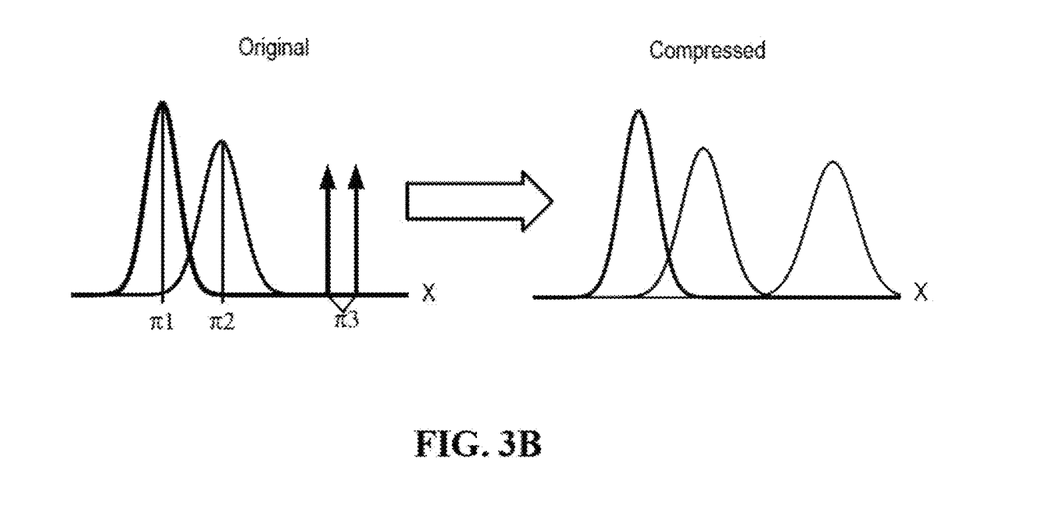
FIG. 3B illustrate an example of a multi-kernel distribution function along the x-axis direction according to one embodiment.

FIG. 3A illustrates an example of a multivariate multi-kernel distribution function according to one embodiment. The horizontal plane (i.e., the x-y plane) corresponds to the image in which multiple ROIs are defined, and the height of each kernel corresponds to a weight. The higher the weight is, the lower the stride value. FIG. 3B illustrate an example of a multi-kernel distribution function along the x-axis direction according to one embodiment. The distribution along the y-axis is omitted for simplicity of illustration. The original distribution function contains two spikes, which can be compressed into one kernel. The three kernels are weighted, and each kernel may be assigned to an ROI to define the stride values in the ROI. The stride distribution for the ROIs in an image may be customized and defined in terms of distribution functions such as the ones shown in FIGS. 3A and 3B. As mentioned before, the height of each kernel corresponds to a weight. The higher the weight is, the lower the stride value. A mapping between the kernel height and the stride value may be per-determined or configurable.

Figure 4:
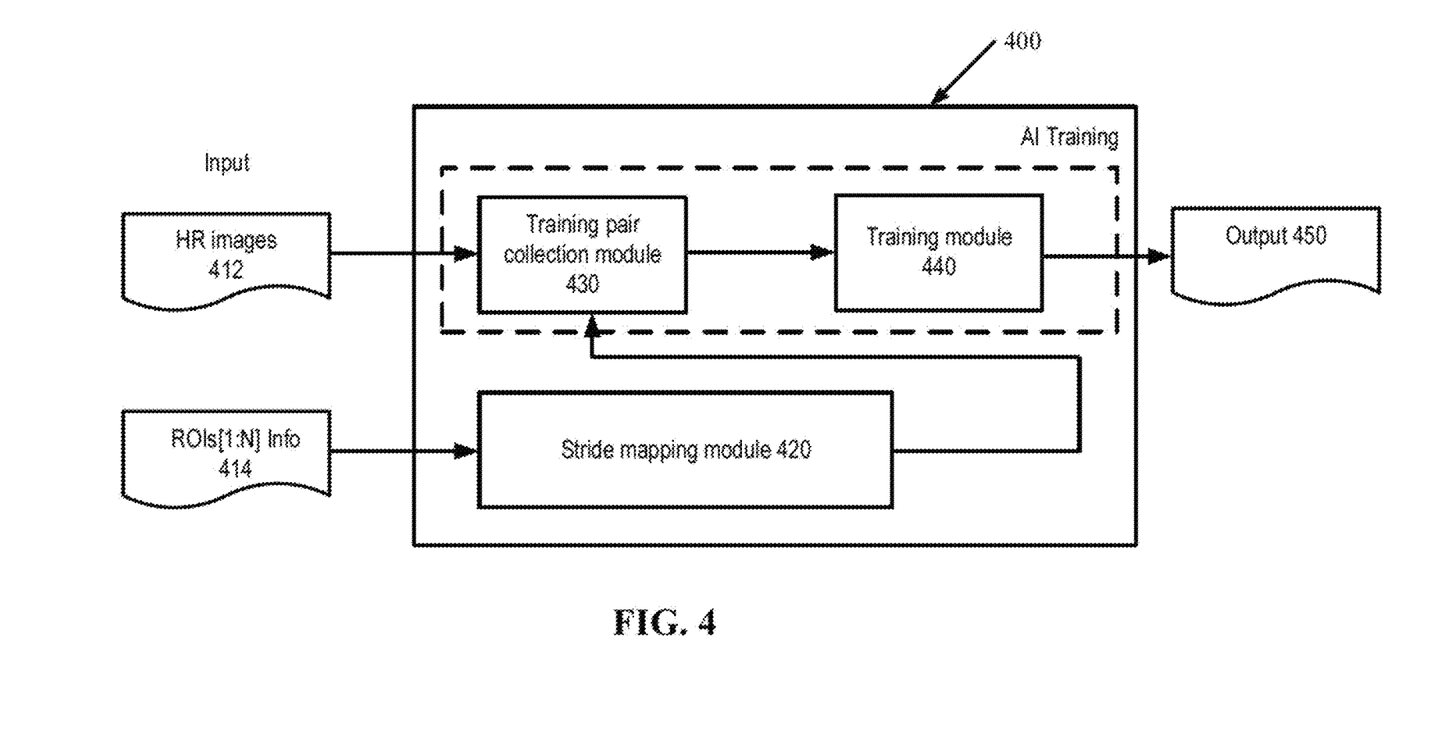
FIG. 4 is a block diagram illustrating a system according to one embodiment.

FIG. 4 is a block diagram illustrating a system 400 according to one embodiment. System 400 receives input images (e.g., HR images 412) and ROI information 414. For each of the N ROIs (N is any positive integer), ROI information 414 indicates its location, shape, boundaries, and/or size (e.g., width and height), and/or other information characterizing the ROI. In one embodiment, the boundaries of each ROI are aligned with the 2D grid that defines the patches shown in FIGS. 2A-2D. A stride mapping module 420 maps a stride value to each patch in the RIOs or the input image. The mapping of the stride values may be specified by the user, patch by patch, feature by feature, or may be based on a parametrized multivariate model. The parametrized multivariate model defines one or more multivariate distribution functions such as uniform, Gaussian, etc. A higher weight means denser sampling and, therefore, a lower stride value. ROI information 414 provides the parameters for identifying the parameterized multivariate model. System 400 may stores a stride mapping table in the memory for use by the stride mapping module 420.

System 400 further includes a training pair collection module 430, which down-samples the input HR images 412 according to the stride values indicated by the sampling rate mapping module 420. For each HR image 412, the training pair collection module 430 generates a corresponding LR image to form a training pair. The training pairs form a training dataset for training an AI model to perform SR operations. System 400 further includes a training module 440, which receives the training dataset and proceeds with a training process for training the AI model. The output of the training module 540 is a trained AI model having a behavior driven by the training data collected with the ROI-guided sampling.

Figure 5:
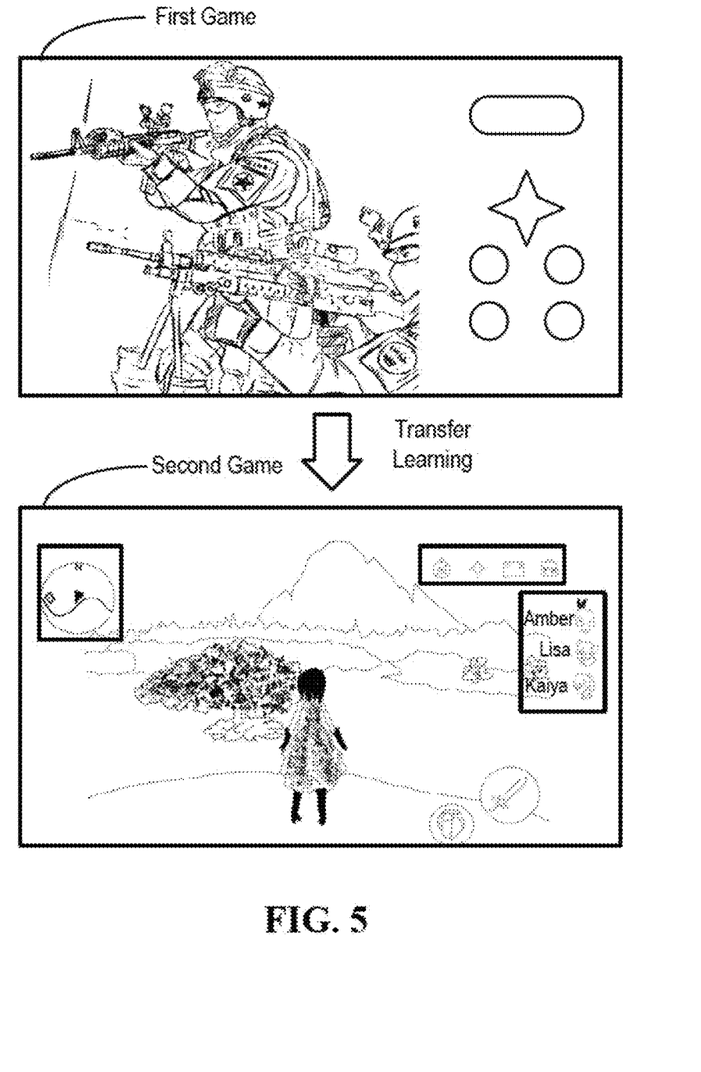
FIG. 5 illustrates an example of transfer learning according to one embodiment.

FIG. 5 illustrates an example of transfer learning, which is an efficient machine learning technique for an AI model. In the context of games, an AI model such as a neural network can transfer, at least partially, what it learns from a first game to a second game. Referring to FIG. 5, the top image is generated in a first game, and the bottom image is generated in a second game. Referring also to FIG. 4, system 400 outputs a trained AI model for SR operations, using training pairs generated in the first game. As the example in FIG. 5 shows, the first game and the second game have very different scenes, characters, and features. The AI model trained for the first game may not perform well on the second game. However, re-training the AI model using a collection of full-size HR images from the second game will take a long time due to the large amount of training data. In one embodiment, the AI model trained for the first game may be re-trained for the second game using training data collected from the ROIs in the second game images. As shown in FIG. 5, a user may select ROIs to focus on game features such as maps, icons, and menus in the second game. When re-training the AI model for the second game, only these selected ROIs are sampled. The AI model is not re-trained for the image content outside the ROIs. The ROI-guided transfer leaning is adaptable to game features such as game objects and elements. The ROIs guide the machine learning to focus on user-selected game features, and to collect a training dataset from the ROIs. Thus, the image quality of the user-selected game objects and elements can be greatly improved, while the re-training data amount and time are significantly reduced.

Figure 6:
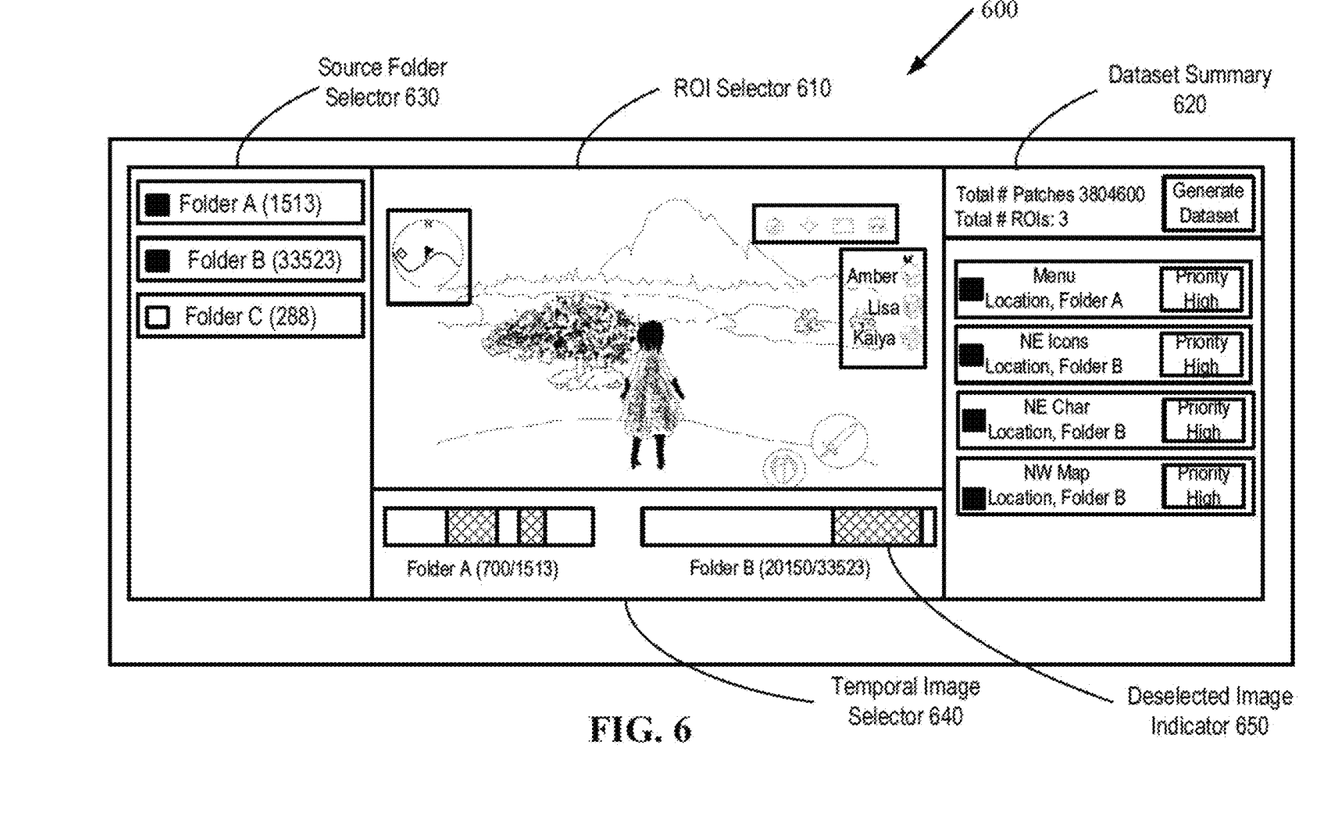
FIG. 6 is a diagram illustrating an example of a graphical user interface (GUI) according to one embodiment.

FIG. 6 is a diagram illustrating an example of a graphical user interface (GUI) 600 for a user to define ROIs according to one embodiment. GUI 600 provides an ROI selector 610, which enables a user to draw or otherwise indicate the boundaries of each ROI in an image. A dataset summary 620 shows the location of each ROI in the image, the system folder that stores the ROI information, and the priority of the ROI. A source folder selector 630 shows which system folders correspond to the ROIs. A temporal image selector 640 shows which images in each system folder are selected or deselected for ROIs. A user may use the deselected image indicator 650 to deselect images in each system folder. Although not shown in FIG. 6, GUI 600 can also show a 2D grid that overlays the image in the ROI selector 610 for the user to define stride values for each image patch, such as in the examples of FIGS. 2A-2D. GUI 600 can also allow the user to specify parametrized multivariate distribution functions for the stride values of each ROI.

Figure 7:
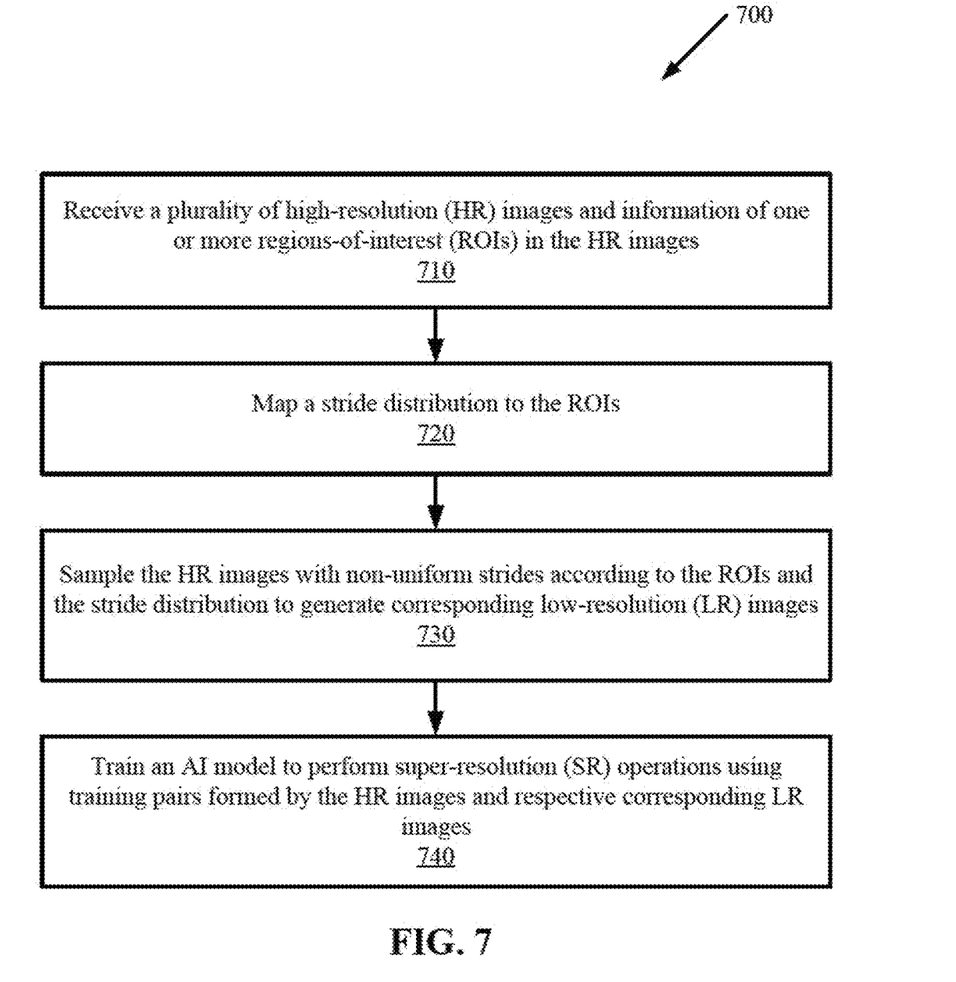
FIG. 7 is a flow diagram illustrating a method for training dataset collection according to one embodiment.

FIG. 7 is a flow diagram illustrating a method 700 for collecting a training dataset for training an AI model according to one embodiment. For example, method 700 may be performed by system 400 in FIG. 4, a system 800 to be described in FIG. 8, and/or another computing system. While the flow diagram of FIG. 7 shows a particular order of operations performed by certain embodiments of the invention, it should be understood that such order is exemplary (e.g., alternative embodiments may perform the operations in a different order, combine certain operations, overlap certain operations, etc.).

Method 700 begins at step 710 when a system receives HR images and information of one or more ROIs in the HR images. The system at step 720 maps a stride distribution to the ROIs. In one embodiment, the stride distribution may include a stride value assigned by a user input. Alternatively or additionally, the stride distribution may include a parameterized multivariate distribution function.

The system at step 730 samples the HR images with non-uniform strides according to the ROIs and the stride distribution to generate corresponding LR images. The system at step 740 trains an AI model to perform SR operations using training pairs formed by the HR images and respective corresponding LR images.

In one embodiment, the AI model adapts its learning from one game to another. The system trains the AI model to perform the SR operations on computer-generated (CG) images of a first game, and re-trains the AI model to perform the SR operations on CG images of a second game. The re-training uses the training data generated from image patches within the ROIs selected from the second game images.

In one embodiment, the AI model training may be performed by a first system and the SR operations may be performed by a second system, where the second system downloads the parameters of the AI model from the first system. The AI model is trained to perform AI operations including, but not limited to, neural network operations, machine learning operations, deep learning operations, etc.

In one embodiment, the HR images are partitioned into multiple image patches by a 2D grid, and the ROIs are defined as regions of contiguous image patches. The one or more ROIs may be mapped to one or more stride values that are lower than a stride value or stride values outside the ROIs. Different ROIs may be mapped to different stride distributions.

In one embodiment, the system receives ROI information from a GUI, the information including boundaries of the one or more ROIs in a corresponding HR image. The system displays a 2D grid overlaying an HR image, and receives a user input of one or more stride values for the image patches defined by the 2D grid.

Figure 8:
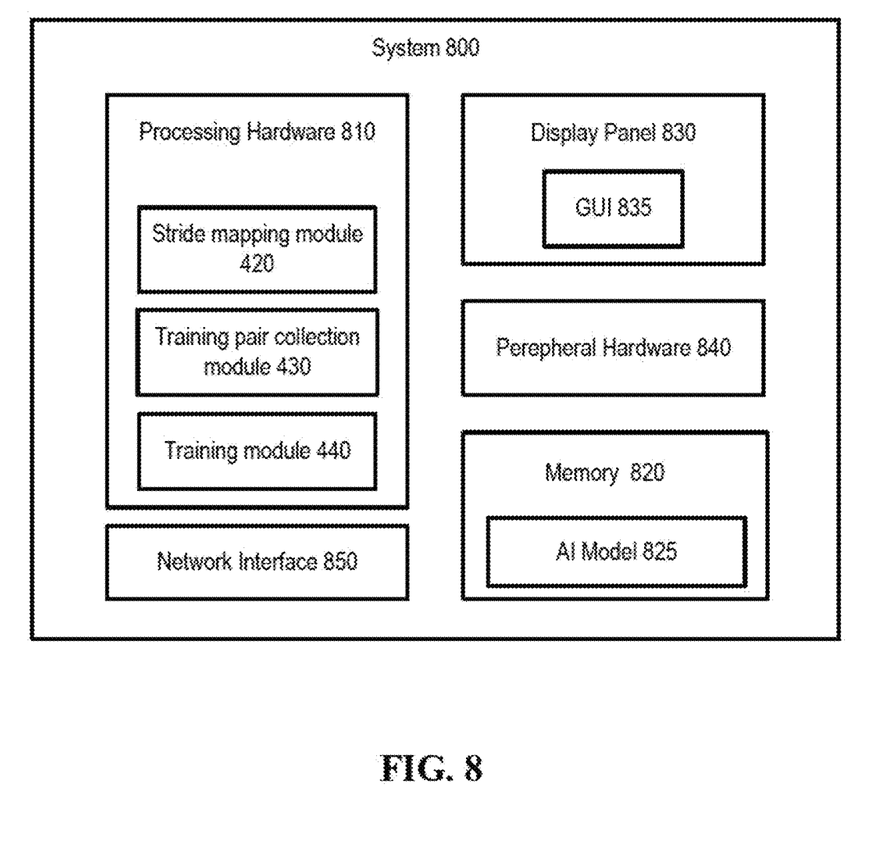
FIG. 8 is a block diagram illustrating a system according to another embodiment.

FIG. 8 illustrates an example of a system 800 according to one embodiment. System 800 includes processing hardware 810. In one embodiment, processing hardware 810 may include one or more processors, such as one or more of: a central processing unit (CPU), a GPU, a digital processing unit (DSP), an AI processor, a multimedia processor, other general-purpose and/or special-purpose processing circuitry. In one embodiment, processing hardware 810 may include a hardware accelerator, such as an AI accelerator. In one embodiment, processing hardware 810 includes stride mapping module 420, training pair collection module 430, and training module 440 in FIG. 4.

System 800 further includes a memory 820 coupled to the processing hardware 810. Memory 820 may include memory devices such as dynamic random access memory (DRAM), SRAM, flash memory, and other non-transitory machine-readable storage media; e.g., volatile or non-volatile memory devices. Memory 820 may further include storage devices, for example, any type of solid-state or magnetic storage device. In one embodiment, memory 820 may store an AI model 825 to be trained for performing SR operations. In some embodiments, memory 820 may store instructions which, when executed by processing hardware 810, cause the processing hardware to perform the aforementioned operations for training data collection, such as method 700 in FIG. 7.

System 800 also includes a display panel 830 to display information such as images, videos, games, texts, and other types of text, image, and video data. Display panel 830 displays a GUI 835 such as GUI 600 in FIG. 6. System 800 may also include additional peripheral hardware 840, such as audio hardware for receiving and generating sounds.

In some embodiments, system 800 may also include a network interface 850 to connect to a wired and/or wireless network for transmitting and/or receiving voice, digital data and/or media signals. It is understood the embodiment of FIG. 8 is simplified for illustration purposes. Additional hardware components may be included.

The operations of the flow diagram of FIG. 7 have been described with reference to the exemplary embodiments of FIG. 4 and FIG. 8. However, it should be understood that the operations of the flow diagram of FIG. 7 can be performed by embodiments of the invention other than the embodiments of FIG. 4 and FIG. 8, and the embodiments of FIG. 4 and FIG. 8 can perform operations different than those discussed with reference to the flow diagram.

Various functional components or blocks have been described herein. As will be appreciated by persons skilled in the art, the functional blocks will preferably be implemented through circuits (either dedicated circuits, or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method for collecting a training dataset for training an artificial intelligence (AI) model, comprising:
   receiving a plurality of high-resolution (HR) images and information of one or more regions-of-interest (ROIs) in the HR images;
   mapping a stride distribution to the ROIs, wherein the ROIs are mapped to one or more stride values that are lower than a stride value or stride values outside the ROIs;
   sampling the HR images with non-uniform strides according to the ROIs and the stride distribution to generate corresponding low-resolution (LR) images; and
   training the AI model to perform super-resolution (SR) operations using training pairs formed by the HR images and respective corresponding LR images.

2. The method of claim 1, further comprising:
   training the AI model to perform the SR operations on computer-generated (CG) images of a first game; and
   re-training the AI model to perform the SR operations on CG images of a second game using training data generated from image patches within the ROIs selected from second game images.

3. The method of claim 1, wherein the stride distribution includes a stride value assigned by a user input.

4. The method of claim 1, wherein the stride distribution includes a parameterized multivariate distribution function.

5. The method of claim 1, wherein the AI model includes a neural network.

6. The method of claim 1, wherein the HR images are partitioned into a plurality of image patches by a two-dimensional grid, and the ROIs are defined as regions of contiguous image patches.

7. The method of claim 1, wherein different ROIs are mapped to different stride distributions.

8. The method of claim 1, further comprising:
   receiving information of the one or more ROIs from a graphic user interface (GUI), the information including boundaries of the one or more ROI in a corresponding HR image.

9. The method of claim 1, further comprising:
   displaying a two-dimensional (2D) grid overlaying an HR image; and
   receiving a user input of one or more stride values for image patches defined by the 2D grid.

10. A system operative to collect a training dataset for training an artificial intelligence (AI) model, comprising:
    a memory to store the AI model; and
    processing hardware coupled to the memory and operative to:
    receive a plurality of high-resolution (HR) images and information of one or more regions-of-interest (ROIs) in the HR images;
    map a stride distribution to the ROIs, wherein the ROIs are mapped to one or more stride values that are lower than a stride value or stride values outside the ROIs;

sample the HR images with non-uniform strides according to the ROIs and the stride distribution to generate corresponding low-resolution (LR) images; and train the AI model to perform super-resolution (SR) operations using training pairs formed by the HR images and respective corresponding LR images.

11. The system of claim 10, wherein the processing hardware is further operative to:

train the AI model to perform the SR operations on computer-generated (CG) images of a first game; and re-train the AI model to perform the SR operations on CG images of a second game using training data generated from image patches within the ROIs selected from second game images.

12. The system of claim 10, wherein the stride distribution includes a stride value assigned by a user input.

13. The system of claim 10, wherein the stride distribution includes a parameterized multivariate distribution function.

14. The system of claim 10, wherein the AI model includes a neural network.

15. The system of claim 10, wherein the HR images are partitioned into a plurality of image patches by a two-dimensional grid, and the ROIs are defined as regions of contiguous image patches.

16. The system of claim 10, wherein different ROIs are mapped to different stride distributions.

17. The system of claim 10, wherein further comprising:

a display panel operative to provide a graphic user interface (GUI), from which information of the one or more ROIs is received, the information including boundaries of the one or more ROI in a corresponding HR image.

18. The system of claim 10, further comprising:

a display panel operative to display a two-dimensional (2D) grid overlaying an HR image, and to receive a user input of one or more stride values for image patches defined by the 2D grid.

* * * * *